UNITED STATES PATENT OFFICE.

WILLIAM GARDINER AND WILLIAM H. DUGGAN, OF CHICAGO, ILLINOIS.

ACTIVE MATERIAL FOR BATTERY-PLATES.

1,342,953. Specification of Letters Patent. Patented June 8, 1920.

No Drawing. Application filed August 23, 1919. Serial No. 319,522.

*To all whom it may concern:*

Be it known that we, WILLIAM GARDINER and WILLIAM H. DUGGAN, citizens of the United States of America, and residents of Chicago, Cook county, Illinois, have invented a certain new and useful Improvement in Active Material for Battery-Plates, of which the following is a specification.

Our invention relates to an improvement in active material for battery plates, and has for its object the provision of a material which will produce a more efficient storage battery and which will permit the ready escape of gases, thereby eliminating the danger of buckling the plates holding the material.

These and other features and objects of our invention will be more readily understood by the following description of the manner in which the material is made.

In order to form the positive plate, we first take a mixture of equal parts of oxid of lead and pure lead, and to two parts of t lead mixture add one part of kieselguhr by volume. To this is then added a small quantity of powdered pumice stone in the proportion of about one part to 100 of the above mixture, and also a small quantity of sulfate of ammonia, preferably in crystal form, in the proportion of one part of sulfate of ammonia to 400 pounds of the lead mixture. The whole is then mixed with sulfuric acid of about 1.100 test, specific gravity, sufficient acid being added to form a thick paste which is then put into the battery plates and left to dry in the usual manner. In this compound the kieselguhr or infusorial earth is a light fluffy compound which is not effected by acid or heat and which operates to thoroughly bind the active material together and also to bind it to the grid, thus preventing the same from becoming loosened and falling down in the bottom of the battery cell during the charging and discharging of the battery. The powdered pumice stone and sulfate of ammonia operate to increase the porosity of the mixture, thereby permitting the gases generated to more readily escape from the mixture, thus preventing the mixture from swelling which eliminates any danger of the plates buckling.

In order to form the negative plate to work with the above positive plate, we first mix equal parts of the oxid of lead and pure lead to which is added a small quantity of carbon, about one part of carbon being added to each two hundred parts of the lead mixture. This is then added to a small quantity of mercury, about one part to three hundred parts of lead mixture, the whole then being mixed with a solution of sulfuric acid about 1,100 specific gravity, until a thick paste is formed. This paste is then put in the plates and left to dry in the usual manner. In this mixture, the carbon operates to increase the efficiency of the mixture by rendering the same a better conductor while the mercury operates to amalgamate the negative plate.

While we have illustrated and described specific embodiments of our invention, it will be understood that we do not wish to be limited to the exact proportions and mixtures described, but that various modifications can be made without departing from the spirit of our invention.

What we claim as our invention is:—

An active material for storage batteries consisting of a mixture containing oxid of lead, kieselguhr, powdered pumice stone, and sulfate of ammonia mixed with an acid solution.

Signed by us at Chicago, Illinois, this 1st day of August, 1919.

WILLIAM GARDINER.
WILLIAM H. DUGGAN.